UNITED STATES PATENT OFFICE.

JAMES DEWAR, OF LONDON, AND ADOLF LIEBMANN, OF WEYBRIDGE, ENGLAND, ASSIGNORS TO THE PROCTER AND GAMBLE COMPANY, OF CINCINNATI, OHIO, A CORPORATION OF OHIO.

PREPARATION AND PRODUCTION OF CATALYSTS.

1,268,692.  Specification of Letters Patent.  Patented June 4, 1918.

No Drawing.  Application filed June 2, 1914. Serial No. 842,537.

*To all whom it may concern:*

Be it known that we, Sir JAMES DEWAR, of 21 Albemarle street, London, England, and ADOLF LIEBMANN, of The Whim, Weybridge, in the county of Surrey, England, both subjects of the King of Great Britain, have invented new and useful Improvements in the Preparation and Production of Catalysts, of which the following is a specification.

It is well known that metallic catalysts can be produced by the reduction of their oxids or hydrates by means of hydrogen.

Moissan first discovered the property of nickel, cobalt, and iron to be capable of producing catalytic action and has already pointed out that the most efficient action is obtained by the metal prepared by reduction of the hydroxid with hydrogen at the lowest possible temperature.

Later on Sabatier and Senderens found in their classic researches on hydrogenation that unsaturated compounds could be transformed in the gaseous state into saturated compounds by the action of hydrogen in the presence of the above named catalysts which had to be used in a very finely divided condition and they further found that copper was also capable of acting as a catalyst.

The reduction of each of the oxids or hydrates of the before named metals by hydrogen commences at a definite temperature varying with each of the oxids or hydrates.

We have found that the temperature at which the reduction by hydrogen of such oxids or hydrates commences can be considerably reduced and this is of importance as the production of catalysts at a low temperature is very advantageous, for various reasons. The lower temperature prevents the possibility of the new molecular aggregations of the finely divided metals. It further renders it possible to produce the catalyst and effect hydrogenation in one operation in the process of the hydrogenation of unsaturated oils and fats, at such a low temperature as to prevent decomposition of such oils and fats and one at which the rapidity of the action is very great. This forms the subject matter of our application of even date, Serial No. 842,538.

Our present invention consists in the reduction by hydrogen at a relatively low temperature of a mixture of the oxids (either hydrated or anhydrous) of two or more of the catalytic metals above referred to or of a mixture of the oxids of one or more of the said catalytic metals with palladium, platinum or silver in a fine state of division. A mixture of the oxids of one or more of the said catalytic metals along with silver oxid can also be employed.

In addition to the hydrated oxids and anhydrous oxids we find also carbonates suitable for the purpose of reduction. The mixture of hydrates or carbonates to be used may be advantageously produced by precipitation of a solution containing two or more salts in proportions which may be widely varied from simple molecular proportions. We do not limit ourselves to any one method of preparing the mixture of these compounds.

The mixture of anhydrous oxids may be obtained from the hydrates or nitrates or carbonates by heating. In practice we find that in preparing the anhydrous oxids from a mixture of nitrates, the use of a mixed aqueous solution gives on evaporation a product which after heating is particularly suitable for the reduction.

It is well known that a single catalyst like nickel can be formed on a support such as asbestos or other porous suitable materials without impairing its efficiency and the mixed catalysts herein described are equally operative when so used.

We classify our invention according to the following types—

A. Reduction by hydrogen of mixtures of hydroxids, oxids, and carbonates, of nickel, cobalt, copper and iron.

B. Reduction by hydrogen of a mixture of a compound as defined in "A" with finely divided palladium, platinum, or silver.

C. Reduction by hydrogen of a mixture of a compound as defined in "A" with silver oxid.

D. The catalysts of the types "A," "B," and "C" produced on the surface of porous substances.

The following examples will serve to illustrate further how the invention can be carried into effect but the invention is not confined to these examples—the parts are by weight.

*Example I.*

A solution prepared by dissolving 98.2 parts of nickel nitrate (containing 6 molecules of water of crystallization) and 9.3 parts of copper nitrate (containing 6 molecules of water of crystallization) is heated and precipitated while hot with a slight excess of caustic soda. The mixture is then boiled and the precipitate collected on a filter and washed with hot water until free from soluble salts. It is subsequently dried on the water bath and the drying is finally completed in an oven at a temperature of about 130° centigrade. The reduction by hydrogen of the oxygen compounds thus obtained is nearly completed after about 2 hours at about 170° centigrade.

*Example II.*

A solution prepared by dissolving 44.6 parts of cobalt nitrate (crystals) and 4.65 parts of copper nitrate (crystals) is heated and precipitated with a slight excess of caustic soda. The mixture is then boiled and the precipitate collected on a filter and washed with hot water until free from soluble compounds, then dried on the water bath. The reduction by hydrogen of the oxygen compound thus produced is practically complete after four hours at about 180° centigrade. The reduction product contains 10 per cent. of copper and 90 per cent. of cobalt.

*Example III.*

A solution prepared by dissolving 65 parts of iron nitrate (crystals) and 4.65 parts of copper nitrate (crystals) is heated and precipitated while hot with slight excess of caustic soda. The mixture is then boiled, filtered and washed until free from soluble compounds, then subsequently dried on the water bath. The reduction by hydrogen of the oxygen compound thus obtained is practically complete after 2½ hours at from about 275° to 320° centigrade. The reduction product contains 10 per cent. of copper and 90 per cent. of iron.

*Example IV.*

A solution of .218 parts of platinum chlorid and 49.1 parts of nickel nitrate (crystals) is poured into a boiling aqueous solution containing thirty parts of caustic soda and two parts by weight of 40 per cent. formalin. The boiling is continued for some time and the precipitate separated is collected on a filter, washed until free from soluble salts and dried on the water bath. On being reduced with hydrogen the reduction is practically complete after four hours at about 200° centigrade and the reduction product contains 1 per cent. of platinum and 99 per cent. nickel.

Mixtures of nickel hydrate and palladium can be prepared in the manner above described with a practically similar result.

*Example V.*

A solution of 89.2 parts of nickel nitrate (crystals) and 3.16 parts of silver nitrate is poured into a warm solution of 30 parts of caustic soda and boiled. The precipitate is then collected on a filter washed until free from soluble compounds and dried on the water bath. The reduction of this compound by hydrogen is practically complete in about 2 hours at about 200° to 210° centigrade and the reduction product contains 10 per cent. of silver and 90 per cent. of nickel.

*Example VI.*

42 parts of kieselguhr are impregnated with 100 parts of a solution containing 12½ parts of nickel nitrate (crystals) and 12½ parts of copper nitrate (crystals). A solution of 11 parts of sodium carbonate in 100 parts of water is added and the whole well stirred together. The precipitate is collected on a filter, washed thoroughly until free from soluble salts and dried on the water bath. The reduction of the oxygen compound thus obtained is practically complete after one hour's treatment with hydrogen at about 170° centigrade, and the metal-bearing portion of the product contains after treatment for another hour at about 180° centigrade 99 per cent. of metallic contents.

For simplicity and convenience, we designate the metals of group "A" above, viz., nickel, cobalt, copper and iron, as "heavy metal catalysts;" and the metals of group "B," viz., palladium, platinum and silver, as "noble metal catalysts." It will be observed that the invention contemplates the preparation of mixed catalysts consisting either of a plurality of the heavy metal catalysts, or of one or more of these heavy metal catalysts in association with a noble metal catalyst. Whatever its components may be, the mixed catalyst may be used by itself, or applied to a porous support. The term "metal of the nickel group" is used to include nickel, cobalt and iron.

What we claim is:—

1. For use in the hydrogenation of fats and oils, a mixed catalyst containing a plurality of heavy metal catalysts and a noble metal catalyst.

2. For use in the hydrogenation of fats and oils, a mixed catalyst containing a plurality of heavy metal catalysts.

3. For use in the hydrogenation of fats and oils, a mixed catalyst containing nickel and copper.

4. The hereindescribed method of preparing a mixed catalyst, which consists in subjecting a mixture of compounds of catalytic metals, one at least of which is a heavy metal catalyst, to reduction by hydrogen at a sufficiently low temperature to avoid producing new molecular aggregates of the finely-divided metals.

5. The hereindescribed method of preparing a mixed catalyst, which consists in subjecting a mixture of compounds of catalytic metals, one at least of which is a heavy metal catalyst, to reduction by hydrogen at a temperature approximating 200° C.

6. The hereindescribed method of preparing a mixed catalyst, which consists in subjecting a mixture of compounds of catalytic metals, one of which belongs to the nickel group, to reduction by hydrogen, at a sufficiently low temperature to avoid producing new molecular aggregates of the finely-divided metals.

7. The hereindescribed method of preparing a mixed catalyst, which consists in subjecting a mixture of compounds of catalytic metals, one of which is nickel, to reduction by hydrogen, at a sufficiently low temperature to avoid producing new molecular aggregates of the finely-divided metals.

8. The hereindescribed method of preparing a mixed catalyst, which consists in subjecting a mixture of compounds of nickel and copper to reduction by hydrogen at a sufficiently low temperature to avoid producing new molecular aggregates of the finely-divided metals.

In testimony whereof we have signed our names to this specification in the presence of two subscribing witnesses.

JAMES DEWAR.
ADOLF LIEBMANN.

Witnesses:
HERBERT D. JAMESON,
GILBERT B. BYRON.